United States Patent [19]

Eguchi et al.

[11] Patent Number: 5,518,620
[45] Date of Patent: May 21, 1996

[54] APPARATUS FOR BIOLOGICAL TREATMENT OF WATER AND METHOD FOR BIOLOGICAL TREATMENT OF WATER USING SAID APPARATUS

[75] Inventors: Masahiro Eguchi, Yono; Haruki Myoga, Misato; Masaki Shimohara, Koshigaya; Teruo Sugizaki, Niiza, all of Japan

[73] Assignee: Organo Corporation, Tokyo, Japan

[21] Appl. No.: 214,218

[22] Filed: Mar. 17, 1994

[30] Foreign Application Priority Data

Jul. 7, 1993 [JP] Japan .................................. 5-167820

[51] Int. Cl.⁶ ........................................................ C02F 3/06
[52] U.S. Cl. ........................ 210/615; 210/622; 210/651; 210/150; 210/151; 210/195.1; 210/900; 261/122.1
[58] Field of Search ..................... 210/150, 151, 210/615, 621, 622, 629, 195.1, 651, 900; 261/101, 122.1

[56] References Cited

U.S. PATENT DOCUMENTS

| | | | |
|---|---|---|---|
| 3,232,865 | 2/1966 | Quinn et al. | 210/150 |
| 3,347,381 | 10/1967 | Minch et al. | 210/150 |
| 3,402,103 | 9/1968 | Amberg et al. | 210/150 |
| 3,580,840 | 5/1971 | Uridil | 210/629 |
| 4,565,727 | 1/1986 | Giglia et al. | 210/505 |
| 4,869,824 | 9/1989 | Melin et al. | 210/615 |
| 4,983,299 | 1/1991 | Lupton et al. | 210/150 |
| 5,271,830 | 12/1993 | Faivre et al. | 210/151 |
| 5,308,482 | 5/1994 | Mead | 210/207 |

OTHER PUBLICATIONS

Collected Articles of the 27th Annual Conference of the Japan Society on Water Environment, Mar. 3, 1993, pp. 8, 9, 548, 549.

Nakamura et al., Substrate Affinity of Oligotrophic Bacteria in Biofilm Reactors, Wat. Sci. Tech., vol. 21, Brighton, pp. 779–790, 1989.

Voice et al., Biological Activated Carbon in Fluidized . . . Volatile Aromatic Hydrocarbons, Wat. Res., vol. 26, No. 10, pp. 1389–1401, 1992.

*Primary Examiner*—Peter A. Hruskoci
*Assistant Examiner*—Theodore M. Green
*Attorney, Agent, or Firm*—Cushman Darby & Cushman

[57] ABSTRACT

An apparatus for biological treatment of water in which a water containing organic matter (e.g. waste water, recovered water, or untreated water in water treatment works) is biologically treated to decompose and remove the organic matter, which apparatus comprises a formed material comprising a felt-like activated carbon fiber cloth, accomodated in the treatment vessel as a packing medium, which has a ratio of surface area ($cm^2$) of felt-like activated carbon fiber cloth to effective volume ($cm^3$) of the treatment vessel, of $0.5$–$50$ $cm^2/cm^3$, and which is arranged so that the cloth surface is vertical and the cloth-to-cloth distance is $0.5$–$2.0$ cm, thereby shortening the rise time from operation start to stable operation, and efficiently operating over a long period of time.

17 Claims, 8 Drawing Sheets

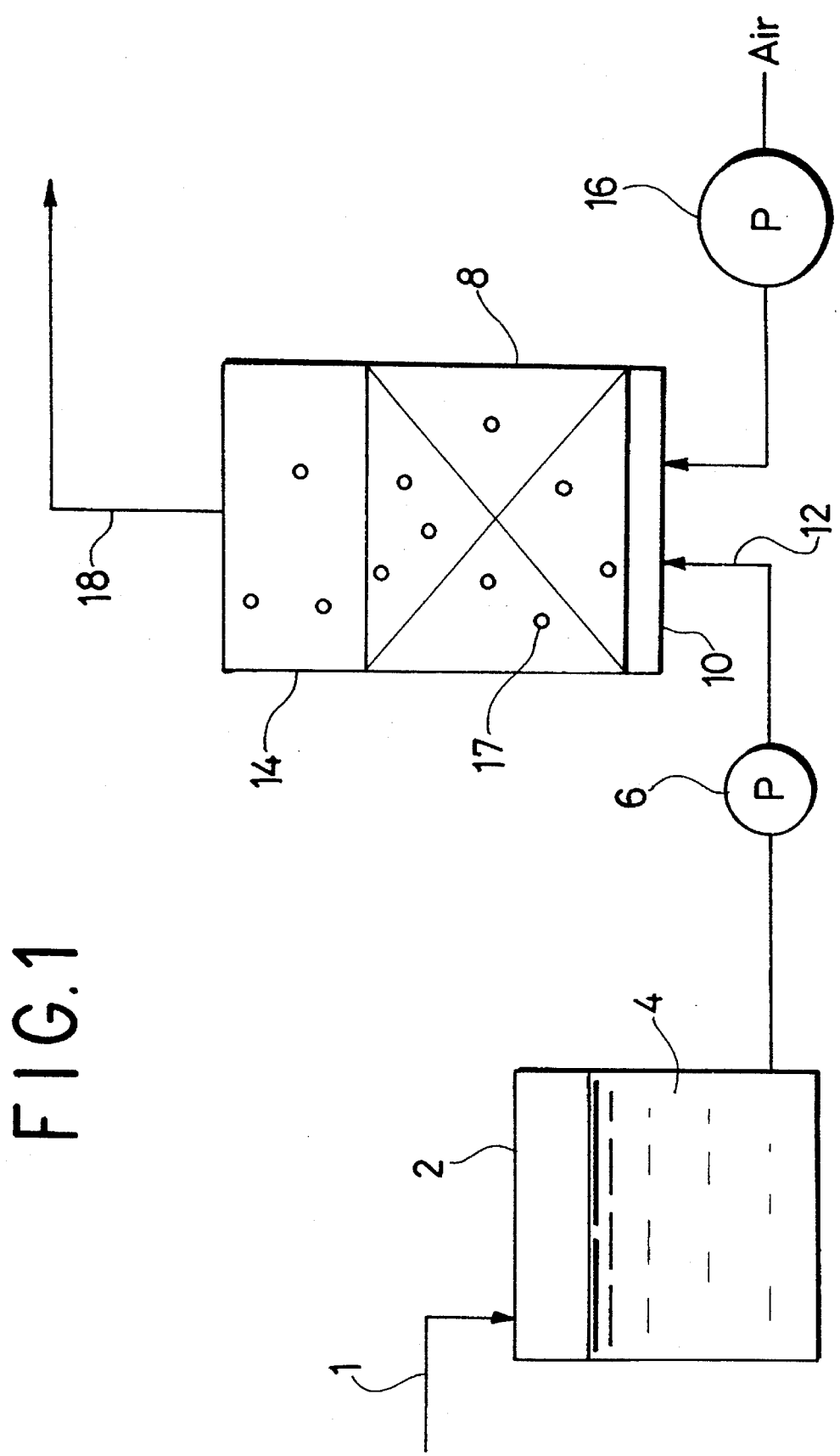

APPARATUS FOR BIOLOGICAL TREATMENT OF WATER AND METHOD FOR BIOLOGICAL TREATMENT OF WATER USING SAID APPARATUS

BACKGROUND OF THE INVENTION

1. Field of the Invention

The present invention relates to an apparatus for biological treatment of water in which a water containing organic matter (e.g. waste water containing organic matter, recovered water containing organic matter or untreated water in water treatment works) is subjected to biological treatment using aerobic microorganisms to decompose and remove the organic matter, as well as to a method for biological treatment of water, using said apparatus. More particularly, the present invention relates to an apparatus for biological treatment of water which can be suitably incorporated into, for example, a recovery system for the ultrapure water used in semiconductor industry, etc., which gives a short rise time from operational start to stable operation, which can conduct biological treatment stably over a long period of time, and which is easy to maintain, as well as to a method for biological treatment of water using said apparatus.

2. Description of the Prior Art

For the biological treatment of an organic matter-containing water to remove the organic matter, active researches are under way on a biological activated carbon method which uses activated carbon as a carrier for microorganisms. This method is said to allow for the treatment of difficult-to-decompose substances and the biological treatment of higher efficiency because, with the method, the time of contact between microorganisms and substrate is longer and inhibitory factors for proliferation of the microorganisms are removed by adsorption [see, for example, WATER RESEARCH, Vol. 26, No. 10, p. 1389–1401 (1992)].

In the biological activated carbon method, there has been used, as the carrier, spherical or granular activated carbon, and the operation for biological treatment of water has been conducted by a fluidized bed method (up flow) or a fixed bed method (down flow). Since the fixed bed method (down flow) has an advantage of very easy maintenance of apparatus but has a serious problem in that the microorganism film formed on the carrier (activated carbon) gets thicker in a relatively short time and causes clogging, the fluidized bed method (up flow) is in general use. The fluidized bed method, however, has the following drawbacks.

(1) Aeration washing may cause the partial leaving of activated carbon (carrier) from the treatment vessel, making difficult the cleaning of the treating vessel. Meanwhile, operation over a long period of time without washing results in the proliferation of too large a number of microorganisms in the treatment vessel, which adversely affects the capability (treatability) of the apparatus.

(2) Pulverization of activated carbon takes place. It invites clogging of membrane separator when such a membrane separator is installed downstream of the treatment vessel.

(3) Formation of microorganism film on activated carbon allows the activated carbon to agglomerate or become lumpy, resulting in adhesion of activated carbon onto the vessel wall, etc. As a result, the flow of the water to be treated tends to become nonuniform (channeling) in the treatment vessel, and the treatment capability of the apparatus is reduced.

(4) It is difficult to keep activated carbon in a desired fluid state, requiring a complicated maintenance procedure for stable operation.

(5) In order to keep a desired fluid state, it is necessary to supply a large amount of a water to be treated to the treatment vessel. Consequently, in many cases, a circulation vessel to conduct aeration of the water (indirect aeration) is separately provided, in addition to the treatment vessel, which leads to a larger and more complicated apparatus.

(6) In the fluidized bed, since the particles of active carbon of fluidized state as carrier collide with each other, the microorganism film formed on each particle tends to peel off from the particle surface, as compared with the case of the fixed bed. Consequently, the time from operational start to stable operation, i.e., the rise time, is longer particularly when the proliferation rate of microorganisms is small as in the case of treating water of low organic matter content, for example, water recovered from the washing operation using ultrapure water in the semiconductor industry.

In contrast, the fixed bed method has no drawbacks inherent in the fluidized bed method as mentioned above. However, the fixed bed has a serious problem in that the microorganism film formed on activated carbon gets thicker in a relatively short time and causes clogging of the packing medium composed of the activated carbon. Thus, the conventional fixed bed method allows for no efficient biological treatment.

SUMMARY OF THE INVENTION

The present inventors made an extensive study in order to remove the above-mentioned drawbacks of the conventional biological activated carbon methods. As a result, the present inventors found that the drawbacks can be removed by arranging a formed material comprising a felt-like activated carbon fiber cloth, at given cloth-to-cloth distances (as hereinafter defined) in a water treatment vessel to use it as a carrier on which microorganisms can grow. The finding has led to the completion of the present invention. The object of the present invention is to provide an apparatus of fixed bed type for biological treatment of water, which gives, in the biological treatment of water, a short rise time from operational start to stable operation, which can conduct biological treatment of water stably over a long period of time, and which is easy to maintain, as well as to provide a method for biological treatment of water using said apparatus. More particularly, the object of the present invention is to provide an apparatus of fixed bed type for biological treatment of water which can be suitably incorporated into, for example, a recovery system for ultrapure water used in the semiconductor industry, etc. and which can remove the organic matter present in a water to be treated, at a high efficiency, as well as to provide a method for biological treatment of water using said apparatus.

The above object has been achieved by the present invention. The present invention provides an apparatus for biological treatment of water in which water containing organic matter is biologically treated to decompose and remove the organic matter, which apparatus comprises (a) a treatment vessel for effecting the biological treatment of water to be treated, (b) a first water pipe connected to the bottom of said treatment vessel, (c) an aeration means provided at the bottom side of said treatment vessel, (d) a second water pipe connected to the top of said treatment vessel, and (e) a formed material comprising a felt-like activated carbon fiber cloth, accommodated in said treating vessel as a packing medium, said felt-like activated carbon fiber cloth having a specific surface area, which is the ratio of surface area ($cm^2$) of felt-like activated carbon fiber cloth to effective volume ($cm^3$) of said treatment vessel, of 0.5–50 $cm^2/cm^3$, and said felt-like activated carbon fiber cloth being arranged so that the cloth surface is vertical and the cloth-to-cloth distances (as hereinafter defined) are 0.5–2.0 cm, whereby said apparatus can conduct an operation comprising introducing water to be treated, containing organic matter, into the treatment vessel through either one of the first and second water pipes, passing the water along the surface of the felt-like activated carbon fiber cloth, subjecting the organic matter in the water to biological decomposition and removal under aerobic conditions by microorganisms living on the felt-like activated carbon fiber cloth while subjecting the water to aeration or no aeration, and discharging the treated water outside the treatment vessel through the other water pipe.

The present invention also provides a method for biological treatment of water using the above apparatus.

In the present invention, since there is used a formed material of particular structure, comprising a felt-like activated carbon fiber cloth, microorganisms can effectively attach to and grow on the activated carbon fiber, which is a carrier; aerobic biological treatment of water can be conducted without causing the clogging of the activated carbon; and the most efficient water treatment flow can be achieved. As a result, the rise time from operational start to stable operation for decomposition and removal of organic matter is short and, moreover, biological treatment of water can be continued stably over a long period of time. Thus, in the present invention, by the use of a formed material of particular structure, comprising a felt-like activated carbon fiber cloth, a flow of biological treatment of water has been achieved in which aerobic biological treatment of water can be conducted with a short rise time and efficiently over a long period of time.

The apparatus for biological treatment of water according to the present invention, may further comprise, in addition to (a) to (e), (f) a circulation vessel having an aeration means, connected with the first and second water pipes, thereby introducing, into the circulation vessel, part of the treated water discharged outside the treating vessel through the first or second water pipe, aerating said treated water by the aeration means and returning the aerated water to the treating vessel.

Further in the apparatus for biological treatment of water according to the present invention, the packing medium which is the formed material accommodated in the treatment vessel is composed of a plurality of layers with an air bubble diffuser being provided between each two adjacent layers.

The method for biological treatment of water according to the present invention, therefore includes also a case using the above apparatus further comprising (f) a circulation vessel and a case using the above apparatus wherein the packing medium is composed of a plurality of layers with an air bubble diffuser provided therebetween.

Provision of the circulation vessel (f) makes it possible, for example, to conduct aeration therein when the treatment vessel is filled with a relatively large amount of the packing medium and aeration in the treatment vessel is difficult; and use of the formed material in a plurality of layers makes it possible to rediffuse the air once fed to the treatment vessel and prevent the nonuniform flow (channeling) of air as well as to ensure efficient air feeding.

The formed material is most preferably a formed material which is obtained by affixing a felt-like activated carbon fiber cloth to an unwoven or woven cloth substrate in a corrugated sheet shape, winding the corrugated sheet into a roll and arranging the roll in the treatment vessel with the axial direction of the roll being vertical. There can also be suitably used, for example, a formed material which is obtained by affixing a felt-like activated carbon fiber cloth to an unwoven or woven cloth substrate in a corrugated sheet shape and arranging vertically in the treatment vessel a plurality of the corrugated sheets parallel to each other at equal intervals; a formed material which is obtained by placing spacers on a felt-like activated carbon fiber cloth and winding them into a roll and which fills the treatment vessel with the roll axis directed vertically; and a formed material which is obtained by placing spacers on a felt-like activated carbon fiber cloth and arranging vertically in the treatment vessel a plurality of such cloths parallel to each other at equal intervals.

In the present method for biological treatment of water, since there occurs no pulverization of activated carbon, it is possible to introduce the treated water discharged outside the treatment vessel, into a membrane separator to effectively remove the microorganisms present in the treated water, whereby treated water of higher purity (from which the microorganisms are removed more completely) can be obtained.

In the present method for biological treatment of water, the untreated water to be fed into the treatment vessel, should preferably contains a total organic carbon in an amount of 5 mg C/l or less. The present apparatus for biological treatment of water, can therefore be suitably incorporated into, for example, a recovery system for ultrapure water used for washing in the semiconductor industry.

Since the present invention uses an apparatus having a constitution as mentioned above, the present invention has the following effects.

(1) Since the packing medium (activated carbon fiber cloth) is a fixed bed, the operation can be carried out in any of up flow and down flow. Therefore, the present apparatus can be operated so as to best fit the quality of water to be treated and the use of treated water.

(2) Aeration can be conducted in the treatment vessel itself even when a large amount of water is treated. This enables elimination of any circulation vessel and pipes, achieving a significant cost reduction.

(3) The washing of the treatment vessel, which has been hitherto difficult, can be conducted easily and at any desired time using air or water, making the apparatus maintenance easy.

(4) Since the problems of active carbon pulverization and nonuniform flow (channeling) have been solved, a higher apparatus capability (a higher water treatability) is obtainable.

(5) In the conventional fixed bed method, since activated carbon particles collide with each other and thickly growing microorganisms thereon is not easy, the rise time of apparatus is long particularly when water of low organic matter concentration (e.g. 5 mg C/l or less in terms of TOC amount) is treated. In contrast, with the present apparatus, the rise time is short even when such water is treated.

(6) By providing a membrane separator downstream of the treatment vessel to remove the microorganisms present in the treated water, treated water of even higher purity can be obtained.

BRIEF DESCRIPTION OF THE DRAWINGS

FIG. 1 is a flow chart showing one embodiment of the present invention.

DETAILED DESCRIPTION AND THE PREFERRED EMBODIMENTS

Figure 2A:
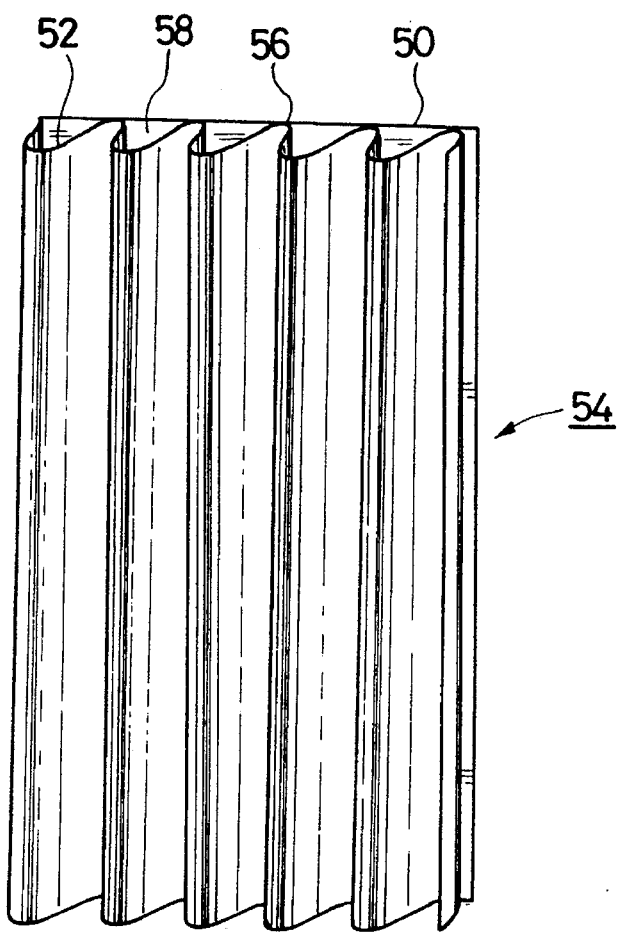
FIG. 2(A) is a schematic perspective view showing an example of the formed material comprising a felt-like activated carbon fiber cloth, used in the treatment vessel of the present invention.

The present invention is hereinafter described in detail with reference to the accompanying drawings.

FIG. 1 is a flow chart showing an embodiment of the present invention. Water 4 to be treated, containing organic matter, such as water recovered from ultrapure water used for washing in the semiconductor industry (this water contains organic matter), is fed through an untreated water pipe 1 and is stored in an untreated water vessel 2.

The water 4 to be treated is fed, by a water pump 6, into the bottom 10 of a bottomed, cylindrical treatment vessel 8 having a closed top end (the top end is provided with a discharge port (not shown) for venting the air 17 used for aeration) through a first water pipe 12. The top end of the treatment vessel 8 may be open depending upon the purification degree required for the water to be treated.

Figure 2B:
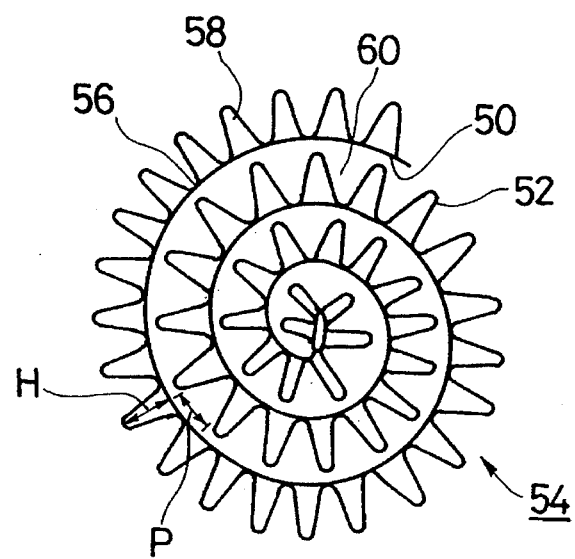
FIG. 2(B) is a schematic plan view showing a state in which the formed material of FIG. 2(A) is wound into a roll.

FIG. 2(A) shows a formed material 54 comprising a felt-like activated carbon fiber cloth, obtained by affixing, by thermal adhesion or the like, a felt-like activated carbon fiber cloth 52 (formed by processing an activated carbon fiber into a felt-like cloth) to an unwoven cloth substrate 50 made of a polyester and a polyethylene, in a corrugated sheet shape. Owing to the corrugated shape, the shaped material 54 has hollow portions 58 each formed by the cloth 50, the cloth 52 and two nearest affixed portions 56. The substrate 50 may also be made of polypropylene and other unwoven cloths. The activated carbon cloth 52 includes, for example, a cloth obtained by knitting fibrous activated carbon and a cloth obtained by processing fibrous activated carbon into a felt-like cloth using a polyester, a pulp or the like as a binder. As the activated carbon fiber cloth 52, there can be used commercial products such as Dexy manufactured by Unitika Limited. Incidentally, the fibrous activated carbon can be produced by a known process. The desirable content of activated carbon in the activated carbon cloth is about 20–90% by weight, preferably about 50–70% by weight based on the weight of the activated carbon fiber cloth. FIG. 2(B) is a plan view showing a state in which the formed material 54 is wound into a roll.

In the treatment vessel 8 as shown in FIG. 1 is provided a formed material 54 of roll type as shown in FIG. 2(B) with its axial direction being made the same as the axial direction of the treating vessel 8. As a result, the formed material 54 is provided in the treatment vessel 8 with its surface arranged vertically and its cloth-to-cloth distances (as hereinafter defined) kept within a desired range. The water to be treated passes through the hollow portions 58 of the formed material 54 and the gaps 60 formed by each two adjacent rows of the formed material 54, specifically the corrugated activated carbon fiber cloth 52 and the unwoven cloth substrate 50 of next row, and ascends from the bottom 10 to the top 14 if the treatment vessel 8. At this time, the organic matter present in the water to be treated, undergoes aerobic biological decomposition by the actions of (1) the oxygen in the air supplied to the bottom of the treatment vessel 8 by an aeration means 16 (an air pump in the present embodiment) and ascending upward through the hollow portions 58 and the gaps 60 similarly to the water to be treated and (2) microorganisms which proliferates on the surface of the activated carbon fiber cloth 52. The treated water of lower organic matter concentration, i.e. lower total organic carbon (TOC) concentration is discharged outside the treatment vessel 8 through a second water pipe 18 connected to the top 14 of the treatment vessel 8. Thus, the water to be treated is passed through the treatment vessel 8 so that its flow becomes parallel to the surface of the active carbon fiber cloth. Incidentally, the discharging of the treated water through the second pipe 18 outside the treatment vessel 8 may be conducted by overflowing, or by a pressure means when the treatment vessel 8 is a closed type and the air after aeration is vented from a discharge pipe provided with a release valve (not shown).

The amount of the air fed for aeration in the treating vessel 8 is about 0.5–50 ml/s., preferably about 5–10 ml/s. per liter of the treating vessel. The amount is appropriately selected depending upon, for example, the kind of microorganisms adhering to and growing on activated carbon fiber cloth, the amount of organic matter in water to be treated, and the amount of said water fed. The sizes of air bubbles used for aeration are preferably about 0.1–10 mm in diameter. The microorganisms adhering to and growing on the activated carbon fiber cloth may be aerobic Oligotrophic bacteria, etc. As the treatment progresses, these bacteria spontaneously adhere to and grow on the felt-like activated carbon fiber cloth, but may be added, before the start of water treatment, in the form of, for example, a bacteria concentrate prepared by solution culture, to shorten the rise time of apparatus from operational start to stable operation.

The sizes of each hollow portion 58 and each gap 60 in the formation of the activated carbon fiber cloth can be such that the free rise of air bubbles in the water to be treated is ensured. For example, the distance between each two adjacent rows of activated carbon fiber cloth arranged vertically (cloth-to-cloth distance) (the pitch or height in the corrugated cloth of FIG. 2(A) or more precisely "P" and "H" in FIG. 2(B), respectively) is about 0.5–2.0 cm, preferably about 1.0–1.5 cm. When the distance is too small, clogging takes place when the microorganism film becomes thick. When the distance is too large, the surface area of cloth is insufficient and inevitably the number of microorganisms is small, resulting in decrease in apparatus capability (treatability). The amount of activated carbon fiber cloth filling the treatment vessel is about 0.5–50 $cm^2/cm^3$, preferably about 3–20 $cm^2/cm^3$ in terms of specific surface area, i.e., the ratio of surface area ($cm^2$) of activated carbon fiber cloth to effective volume ($cm^3$) of the treatment vessel. When the amount is too small, the surface area of cloth is insufficient, resulting in decrease in treatability. When the amount is too large, the microorganism film becomes thick and clogging occurs. In the present invention, "specific surface area" refers to the ratio of (a) surface area of activated carbon fiber cloth (total length×total width×2), in which the pores of the activated carbon fiber cloth are not considered, to (b) effective volume of the treatment vessel.

The amount of water fed for treatment is determined so that the residence time in the treatment vessel becomes 10–120 minutes and the flow rate of said water in the treatment vessel becomes about 0.5–6 SV. With this amount of feed water, the biological treatment of said water can be conducted efficiently.

When the formed material has a structure as shown in FIG. 2(B), the flow inside the treatment vessel is not hindered even when the formed material fills the treatment vessel at a high specific surface area. As a result, the rise time from operational start to stable operation can be as short as about 1/3 or less of the rise time of the conventional treatment vessel of fluidized bed type. Further, no clogging of the packing medium composed of the activated carbon fiber cloth occurs even when the formed material is packed at a high specific surface area, making possible the efficient operation of biological treatment over a long period of time. Furthermore, reactivation (regeneration) of used activated carbon fiber cloth can be easily accomplished by air washing or the like.

Figure 3:
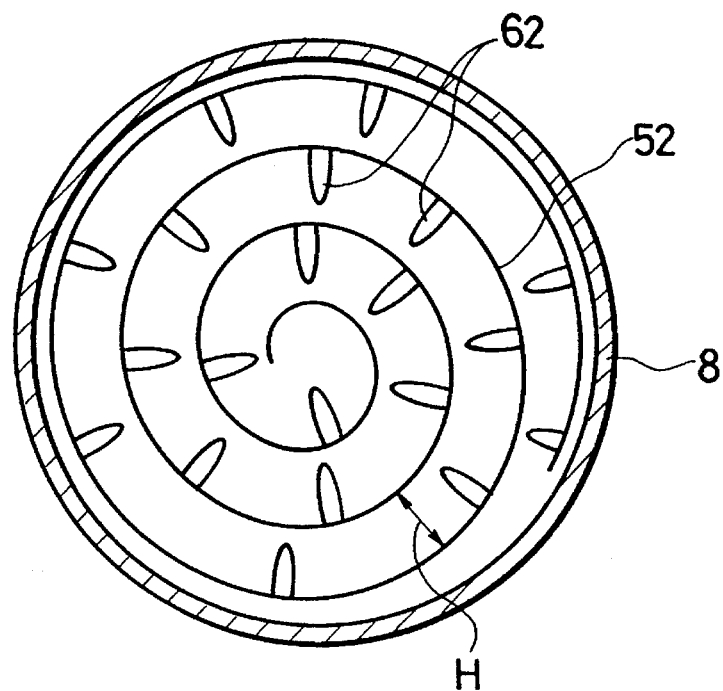
FIG. 3 is a plan view showing a state in which another formed material different from that of FIG. 2(B) fills the treatment vessel used in the present invention.

FIG. 3 shows another example of the formed material. In this example, an activated carbon fiber cloth 52 is wound into a roll with the aforementioned cloth-to-cloth distance ("H") left by providing spacers 62 between each two adjacent rows of the cloth 52. The formed material is inserted into a treatment vessel 8 with its axial direction being made the same as the axial direction of the treatment vessel. The spacer is made of a polyester or a polyethylene and is affixed to the activated carbon fiber cloth by thermal adhesion.

Figure 4:
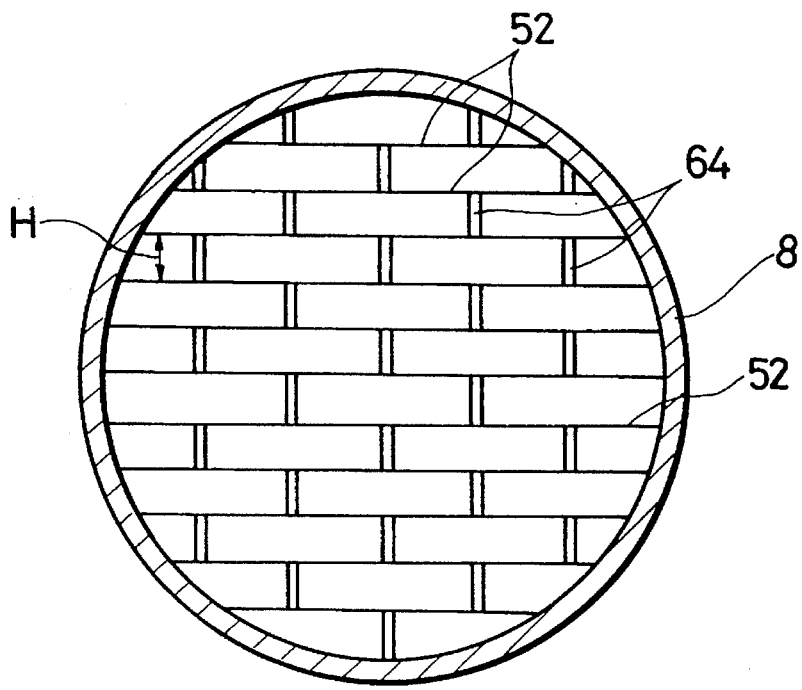
FIG. 4 is a schematic plan view showing a state in which still another formed material fills the treatment vessel used in the present invention.

FIG. 4 shows still another example of the formed material. In this example, a large number of activated carbon fiber cloths 52 are arranged in parallel, with each surface being along a vertical line; spacers 64 are provided between each two adjacent cloths; the resulting formed material is accommodated in a treatment vessel 8 with its axial direction being made the same as the axial direction of the treatment vessel. The specific surface area of activated carbon fiber cloths, the distance between each two adjacent active carbon fiber cloths (cloth-to-cloth distance="H") and the spacers may be the same as mentioned above.

Figure 5:
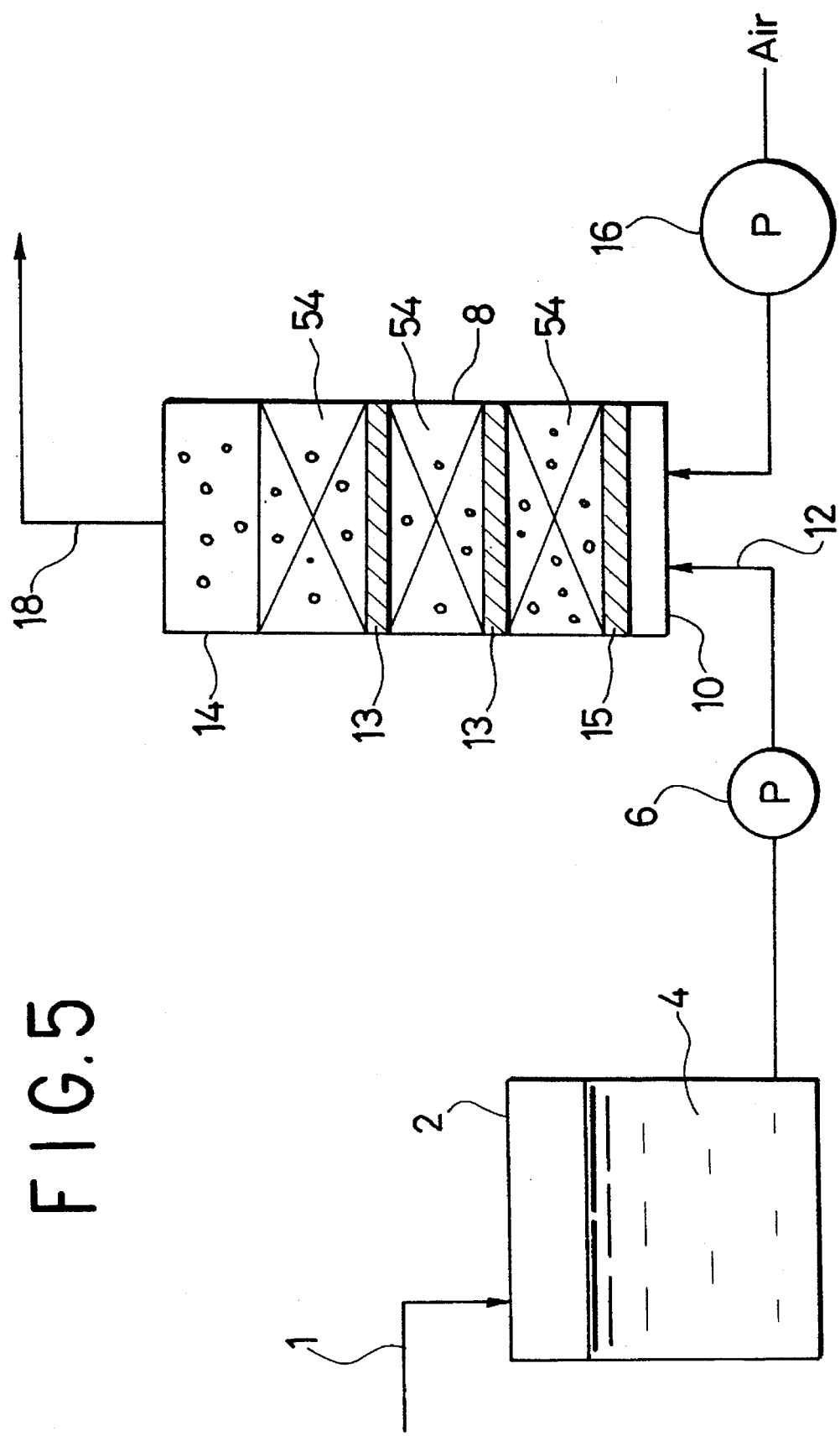
FIG. 5 is a flow chart showing another embodiment of the present invention.

FIG. 5 shows a flow chart of another embodiment.

This embodiment is the same as that of FIG. 1 except that the packing medium of the formed material 54 is composed of a plurality of layers (three layers in FIG. 5) and that air bubble diffusers 13 and 13 are provided between the layers. In such an embodiment, the number of layers is ordinarily about 2 to 15 and can be determined depending upon the quality of water to be treated and the quality required for treated water.

The air bubble diffusers 13 have a function of (1) rediffusing the air bubbles which have reached the diffusers through the hollow portions and gaps of the formed material of lower layer(s) and (2) randomizing the flow paths of the air bubbles, whereby the air bubbles can be distributed as uniformly as possible throughout the treatment vessel. This embodiment can prevent the nonuniform flow (channeling) of air and ensures efficient air feeding.

There is no particular restriction as to the type or specification of the diffusers 13 as long as they can pass air bubbles therethrough and can diffuse them. As the diffusers, there can be used, for example, a mat obtained by molding a porous material made of a synthetic resin, e.g., polypropylene resin (e.g. Hechimaron (trade name) manufactured by Shinko Nylon), and a perforated plate having a large number of pores. The sizes of air bubbles after diffusion are preferably about 0.1–10 mm in diameter.

In FIG. 5, another air bubble diffuser 15 made of the same material as the above air bubble diffuser 13 is also provided below the formed material 54 of the lowest layer.

Figure 6:
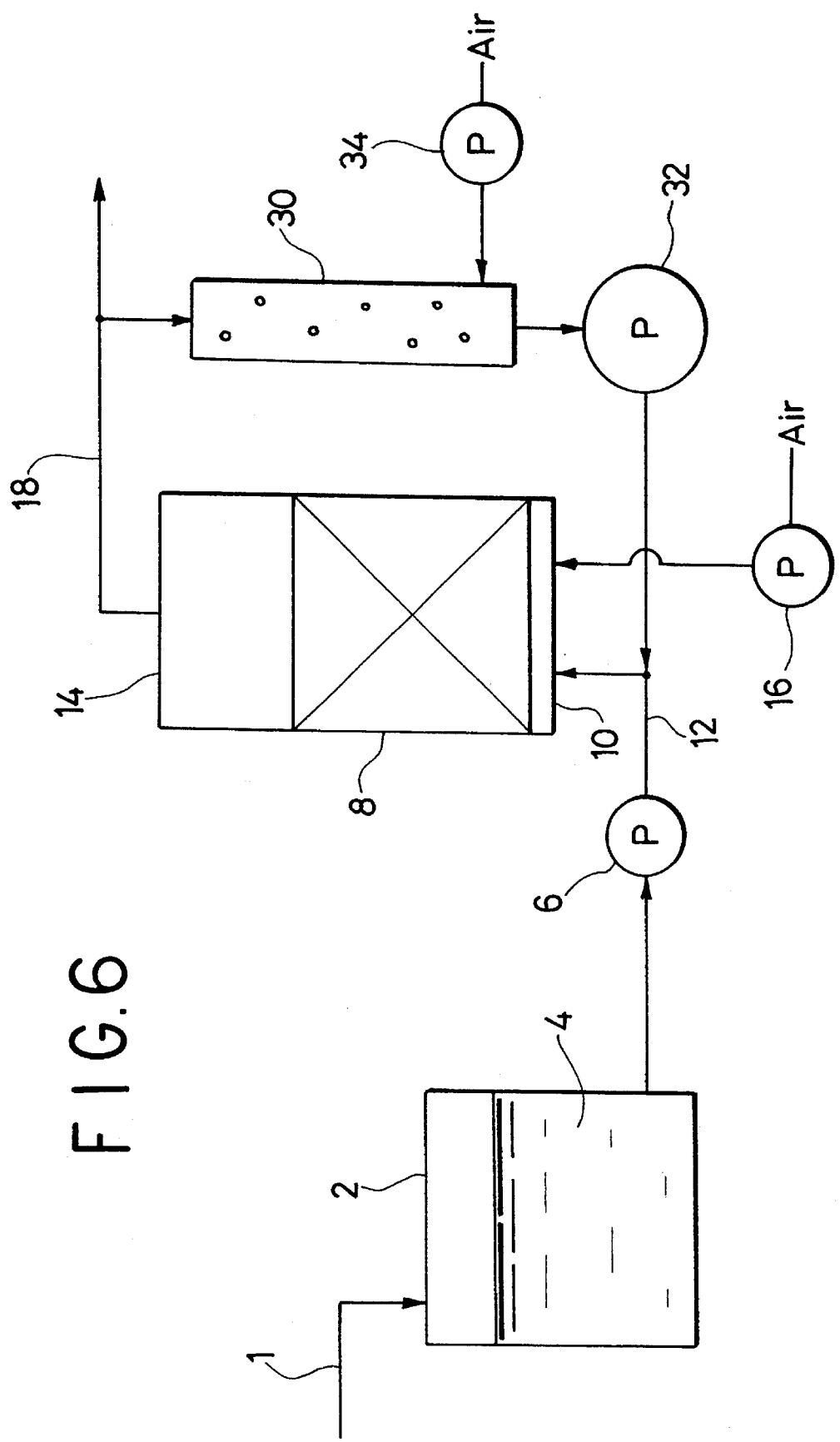
FIG. 6 is a flow chart showing still another embodiment of the present invention.

FIG. 6 is a flow chart showing still another embodiment.

This embodiment has nearly the same constitution as the embodiment shown in FIG. 1. In this embodiment, between a second water pipe 18 and a first water pipe 12 are provided a circulation vessel 30 and a circulation pump 32. Part of the biologically treated water flowing through the second water pipe 18 is introduced into the circulation vessel 30 for aeration by an aeration means 34 (an air pump in this embodiment). The aerated water is sent to the first water pipe 12 via the pump 32 to be combined with untreated water 4 and fed into a treatment vessel 8. No aeration is conducted in the treatment vessel 8. An aeration means 16 attached to the bottom of the treating vessel 8 is not operated in ordinary treatment and is used only for aeration washing of the treatment vessel 8. Provision of the circulation vessel makes it possible to conduct aeration therein when the treatment vessel is filled with a relatively large amount of the packing medium and aeration in the treatment vessel is difficult. The amount of the aerated water returned to the treating vessel is about 10–90%, preferably about 40–60% based on the amount of the main stream (a stream directly fed from the untreated water vessel 2).

Figure 7:
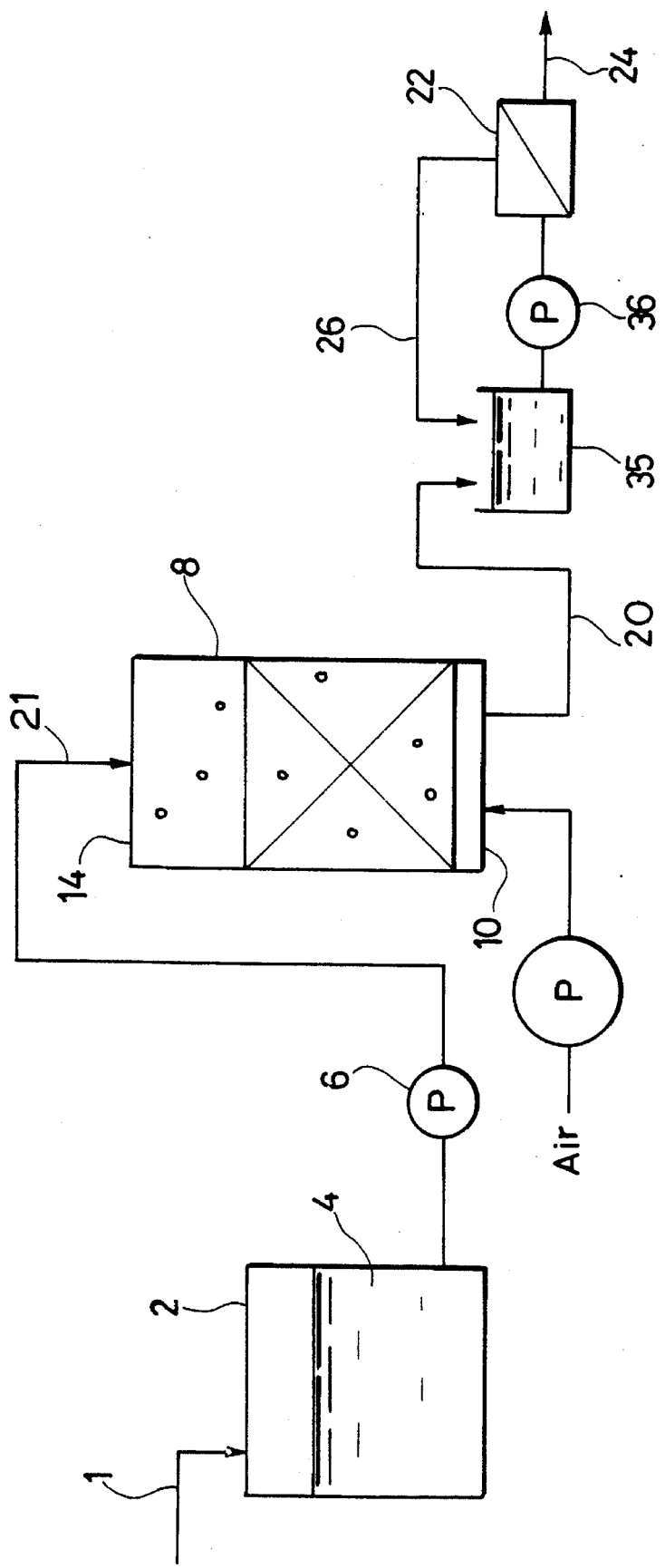
FIG. 7 is a flow chart showing still another embodiment of the present invention.

FIG. 7 shows still another embodiment of the present invention. In this embodiment, water 4 to be treated is fed into a treatment vessel 8 through a first water pipe 18 connected to the top 14 of the treatment vessel 8 and treated water is discharged from a second water pipe 12 connected to the bottom 10 of the treatment vessel 8. This embodiment has an advantage in that counterflow washing is possible when clogging occurs inside the treating vessel, especially at the top of the vessel.

The treated water discharged from the second water pipe 12 is once stored in a treated water tank 35 and then sent to a membrane separator 22 by a pump 36 for removal of microorganisms contained in the treated water, whereby further purified water 24 is obtained. The concentrate water 26 generated in the separator 22 is returned to the treated water vessel 35, as shown in FIG. 7, or to an untreated water vessel 2 (not shown). In FIG. 7, the numerals other than 35 (treated water vessel), 36 (pump), 22 (membrane separator), 26 (concentrated water) and 24 (purified water) have the same definitions as given previously. By returning the concentrate water to the treated water vessel, a higher water recovery ratio is attained. By returning the concentrate water to the untreated water vessel, a higher water recovery ratio is attained and the retention of microorganisms in the treatment system is possible.

The membrane separator may be any membrane separator as long as it can remove the microorganisms present in the treated water. There may be used a membrane microfiltration separator, an ultrafiltration separator, a reverse osmosis separator, etc. The treated water contains part of the microorganisms grown on the formed material for biological treatment as well as their metabolites. Since these organic components are reported as part of the total organic carbon (TOC) present in the treated water, this TOC does not exactly indicate to what extent the organic matter inherently present in the untreated water has been decomposed and removed. It is therefore advisable to conduct a membrane treatment. Also in cases wherein the presence of microorganisms, etc. in the treated water is deleterious, it is necessary to subject the treated water to a membrane treatment.

The filtration (or permeation) method is not necessarily restricted to filtration (or permeation) of cross flow type as mentioned previously, and the filtration (or permeation) of dead-end type may also be employed in which the whole portion of the water fed into the membrane separator 22 is filtered and taken out as filtered (or permeated) water. The treated water vessel 35, the pump 36 and the membrane separator 22 provided downstream of the second water pipe 12 in FIG. 7, may be provided downstream of the second water pipe 18 in FIGS. 1, 5 and 6.

According to the apparatus and method of the present invention for biological treatment of water, as compared to the treatment using the conventional fluidized bed type apparatus, etc., the rise time can be shortened ordinarily to about ½ to ¼. Such an effect is striking particularly in the treatment of water of low organic matter content (e.g. TOC of 5 mg C/l or less, practically TOC of 1–5 mg C/l). The present invention is therefore suitable particularly for the treatment of water of low organic matter content. Needless to say, the present invention is also applicable to the treatment of ordinary sewage, waste water, etc. all of high organic matter content. In the present invention, the organic matter present in water to be treated can be decomposed and removed by up to about 77–99% under stable operation, and the stable operation can be maintained over a long period of time.

The present invention is hereinafter described more specifically by way of Examples.

Example 1 and Comparative Example 1

Figure 8:
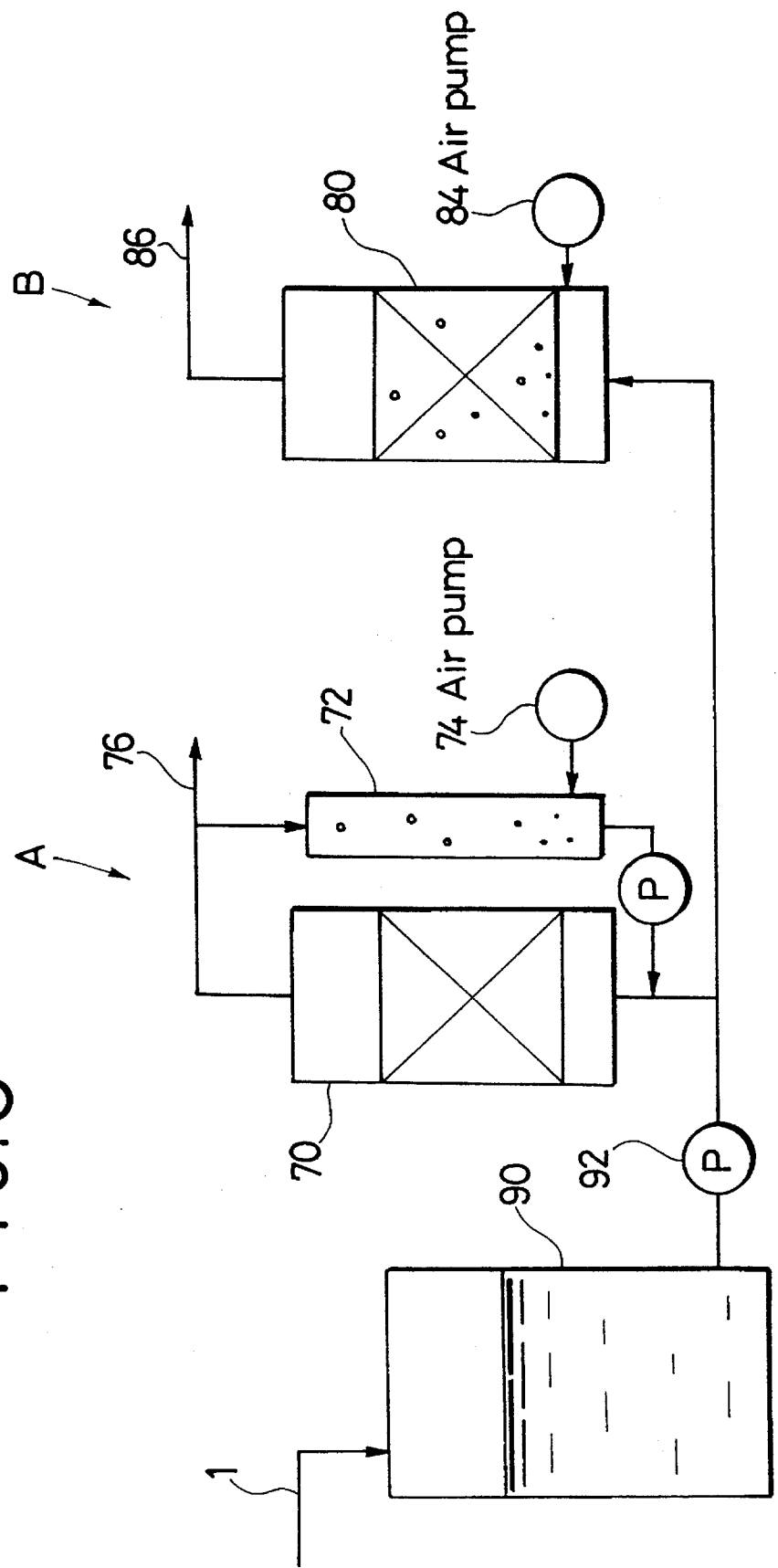
FIG. 8 is a flow chart showing the constitutions of the apparatus (B) of Example 1 and the apparatus (A) of Comparative Example 1.

Removal of total organic carbon (TOC) was conducted using the apparatuses for biological treatment, shown in A (Comparative Example 1) and B (Example 1) of FIG. 8.

In the apparatus A, a treatment vessel 70 (diameter= 70 mm, height=430 mm, effective volume=1,500 ml) was filled with spherical activated carbon (BAC manufactured by Kureha Chemical Industry Co., Ltd.) so that the specific surface area of the activated carbon became 12.2 cm$^2$/cm$^3$. A circulation vessel 72 was provided for fluidization of the activated carbon and part of the treated water discharged from the treating vessel 70 was passed through the circulation vessel 72 at a rate of 90 l/hr. Air was blown into the circulation vessel 72 at a rate of 10 ml/sec using an air pump 74. The circulation vessel 72 had a diameter of 35 mm and a height of 430 mm.

In the apparatus B, a treatment vessel 80 (having the same dimensions as the treating vessel 70) was filled with a formed material (a fixed bed) so that the specific surface area of the formed material became 5.7 cm$^2$/cm$^3$. The formed material was obtained by affixing, to an unwoven cloth substrate (320 mm×600 mm), a felt-like activated carbon fiber cloth (activated carbon content=60% by weight, trade name=Corwave 10A, manufacturer=Unitika Limited) in a corrugated sheet shape (pitch=10 mm, height=7 mm) and then winding the corrugated sheet into a roll, as shown in FIG. 2(B). Air was blown into the treatment vessel 80 at a rate of 10 ml/sec using an air pump 84.

In an untreated water tank 90 was stored a water to be treated, containing methanol, acetone and isopropyl alcohol as main impurity components and having a TOC concentration of 2 mg C/l. The water was fed into the treatment vessel 70 of the apparatus A and the treatment vessel 80 of the apparatus B at the same flow rate (residence time=10 minutes, SV=6) using a pump 92.

Figure 9:
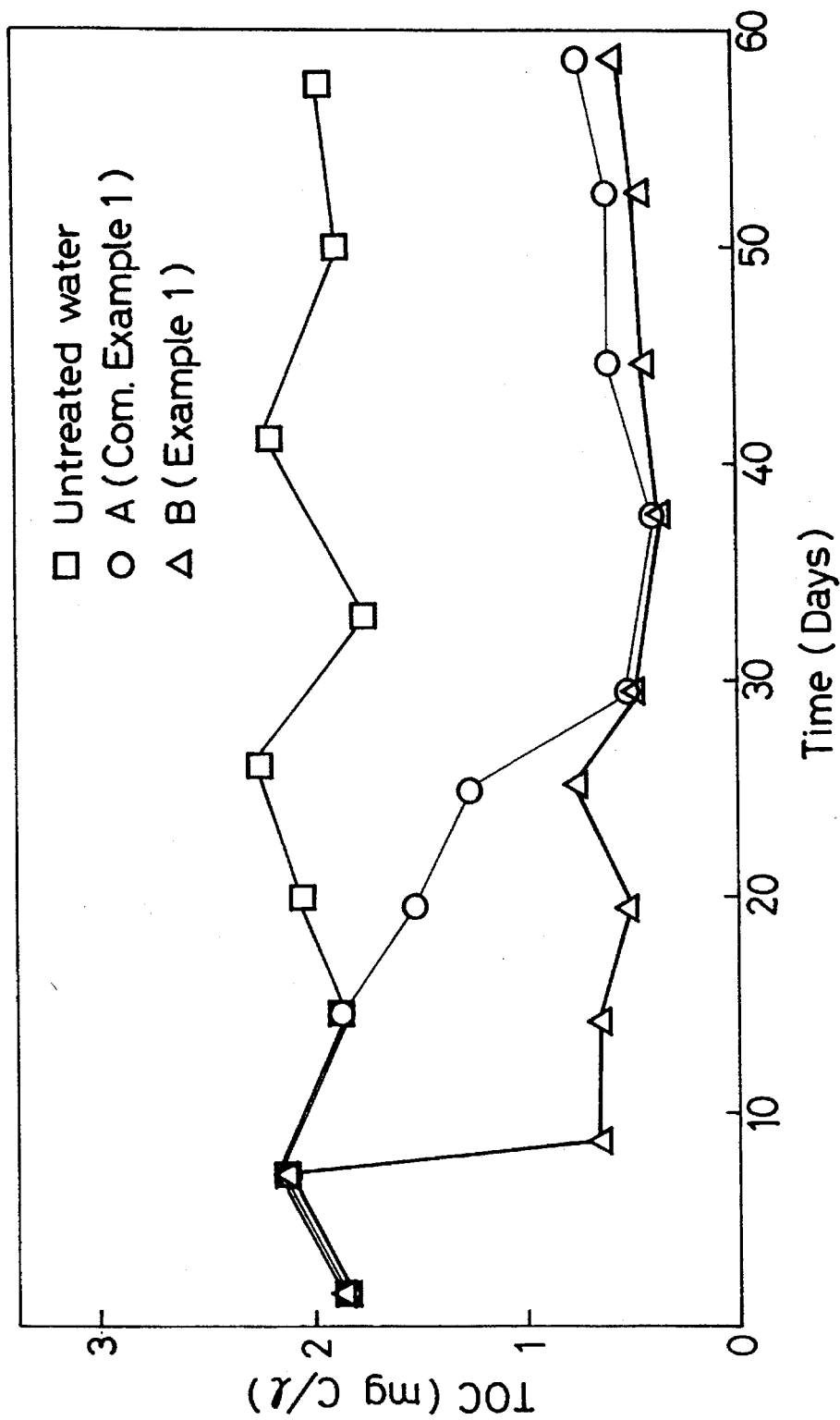
FIG. 9 is a graph showing the relation between treated water TOC and operational time, in Example 1 and Comparative Example 1.

The relation between operational time and measured TOC in treated water 76 or 86 are shown in FIG. 9. The measurement of TOC was conducted using a TOC meter (TOC-5000 manufactured by Shimadzu Corporation).

As is clear from FIG. 9, a desired treatability was achieved in about 10 days from the start of treatment when the apparatus B of the present invention was used, while about 30 days was required to attain a stable operation when the apparatus A (the conventional apparatus) was used. Thus, the rise time could be shortened by about 20 days by the use of the apparatus of the present invention. After the rise time, the TOC in treated water was stable for up to about 60 days at about 500 μg C/l in both of the apparatus A and the apparatus B. In the apparatus A, however, nonuniform flow (channeling) appeared in the treatment vessel with the proliferation of microorganisms, inviting insufficient fluidization and, in the 60th day from operational start, making normal operation impossible. Also, the fluidized bed made washing difficult.

In the apparatus B of the present invention, satisfactory operation could be continued easily, by applying air washing (100 ml/sec) at given intervals.

Further, a membrane separator comprising a hollow fiber type microfiltration membrane was provided downstream of the apparatus B, and the treated water discharged from the treatment vessel 80 was continuously passed through the membrane separator. As a result, the ratio of microorganisms removed was 99% or more and the TOC concentration in final treated water became about 200–300 μg C/l. The treated water discharged from the membrane separator can therefore be satisfactorily used as pure water (deionized water) or as feed water for production of ultrapure water.

Examples 2–3 and Comparative Examples 2–3

The following operation was carried out in the same manner as in Example 1. That is, an untreated water containing organic matter in a total organic carbon (TOC) amount of 2 mg C/l, shown in Table 2 was fed into a reactor filled with one of the active carbons shown in Table 1. The residence time of the water in the reactor was 10 minutes. In each of Examples 2 and 3, there was used, as a fixed bed, a formed material comprising a felt-like activated carbon fiber cloth, which was similar to the shaped material used in Example 1. The specific surface areas of the formed materials were controlled by the number of turns of rolling. In Comparative Example 2, there was used, as a fixed bed, 150 pieces of cylindrical formed material (activated carbon fiber) randomly accommodated in the reactor. Each piece of cylindrical formed material was made of the same felt-like activated carbon fiber cloth as used in Example 1 and had an outside diameter of 25 mm, an inside diameter of 9 mm and a length of 9 mm. In Comparative Example 3, the same spherical activated carbon as used in Comparative Example 1 was used as a fluidized bed. In Comparative Example 3, the treated water was circulated through a circulation vessel for fluidization at a rate of 90 l/hr and aeration (10 ml/sec) was conducted in the circulation vessel.

TABLE 1

| | Carrier | Specific surface area (cm²/cm³) |
|---|---|---|
| Example 2 | Felt-like active carbon fiber | 5.8 |
| Example 3 | Felt-like active carbon fiber | 7.9 |
| Comparative Example 2 | Cylindrical active carbon fiber | 2.4 |
| Comparative Example 3 | Spherical active carbon | 12.2 |

TABLE 2

| Organic matter | Concentration (μg/l) |
|---|---|
| Methanol | 400 |
| Acetone | 80 |
| Isopropanol | 3000 |

In Examples 2 and 3 and Comparative Example 2, the treatability of each apparatus stabilized in about 10 days from the operational start, after which the TOC of the treated water was substantially constant at about 500 μg C/l for about 2 months. In Comparative Example 3, the treatability stabilized in about 20 days from the operational start, after which the TOC of the treated water was substantially constant at about 500 μg C/l as in Examples 2 and 3 and Comparative Example 2. The amounts of TOC and three components (methanol, acetone and isopropyl alcohol) in each treated water in the 11th day from operational start are shown in Table 3. Determinations of methanol, acetone and isopropyl alcohol were conducted by gas chromatography using Hitachi G-3000 FID. In the 11th day, the reactors of Examples 2 and 3 and Comparative Example 2 were past the rise time and each treated water discharged from these reactors had a TOC concentration of about 600 μg C/l. Also in the 11th day, the removal ratios of the total of methanol, acetone and isopropanol when converted to organic carbons, in respective reactor were about 99% (Example 2), about 93% (Example 3), about 82% (Comparative Example 2) and about 12% (Comparative Example 3). Incidentally, the concentrations of these organic compounds in the untreated water fluctuated with time, and Table 3 also shows these values of the unreacted water on the 11th day.

As is clear from the above results, when fibrous activated carbon was used as a carrier, as compared with the case when spherical activated carbon was used, the ratio of organic matter decomposed, i.e. the TOC removal ratio was very high. Meanwhile, the removal ratio of total of methanol, acetone and isopropanol was about 90–99% in stable operation when there were used formed materials of the present invention made of a felt-like activated carbon fiber cloth, but was lower (about 82%) when there was used a formed material made of the same fibrous activated carbon but molded into a cylindrical shape.

TABLE 3

| | TOC (μg C/l) | Methanol (μg/l) | Acetone (μg/l) | Isopropanol (μg/l) |
|---|---|---|---|---|
| Untreated water | 1840 | 130 | 70 | 2909 |
| Example 2 | 615 | N.D. | N.D. | 36 |
| Example 3 | 642 | N.D. | N.D. | 202 |
| Comparative Example 2 | 627 | N.D. | 65 | 478 |
| Comparative Example 3 | 1607 | N.D. | N.D. | 2747 |

TABLE 3-continued

| | TOC (μg C/l) | Methanol (μg/l) | Acetone (μg/l) | Isopropanol (μg/l) |
|---|---|---|---|---|

The cylindrically formed material made of fibrous activated carbon (Comparative Example 2) gave much the same TOC reduction as the formed material of the present invention made of a felt-like activated carbon fiber cloth (Examples 2 and 3) but was inferior to the latter formed material in terms of the removal of methanol, acetone and isopropyl alcohol. The reason is attributable to the fact that microorganisms and their metabolites present in the treated water accounted for a high portion of TOC, in addition to compounds such as methanol, acetone and isopropyl alcohol present in the treated water, meaning that a TOC value is the sum of microorganisms, their metabolites and organic compounds such as methanol, acetone and isopropyl alcohol present in the treated water. In Comparative Example 2, the proliferation of microorganisms was not as vigorous as in Examples 2 and 3 due to low specific surface area of the formed material of the cylindrical shape. As a result, the treated water of Comparative Example 2 must have contained relatively small amounts of microorganisms and their metabolites, thus apparently leading to a higher TOC removal. But in Comparative Example 2 the decomposition of methanol, acetone and isopropyl alcohol must not have been as great as in Examples 2 and 3 also due to less vigorous proliferation of microorganisms. In fact, when the treated waters of Examples 2 and 3 and Comparative Example 2 were passed through the same membrane separator as used in Example 1, to remove the microorganisms present in respective treated waters (i.e., elimination of factors pertaining to microorganisms) and then subjected to TOC measurement, the resulting TOC amounts of Examples 2 and 3 were smaller than that of Comparative Example 2. In contrast, in Comparative Example 3, the packing medium (spherical activated carbon) had a large specific surface area but the proliferation of microorganisms thereon was extremely low due to the activated carbon not being fibrous activated carbon. Fibrous activated carbon is suitable for the adherence and proliferation of microorganisms but, when molded into a cylindrical shape, its specific surface area is small and it can not make effective use of the ability of microorganisms. Incidentally, in Example 3, microorganisms proliferated but their organic matter decomposability was not as good as that of Example 2 probably due to the layers being more densely packed than that of Example 2.

By combining the apparatuses of Example 2 and Example 3 with the same membrane separator as used in Example 1, the treated waters of Example 2 and Example 3 can be satisfactorily used as pure water (deionized water) or as feed water for production of ultrapure water.

What is claimed is:

1. An apparatus for biological treatment of water in which water containing organic matter is biologically treated to decompose and remove the organic material, which apparatus comprises (a) a treatment vessel for effecting the biological treatment of the water to be treated, (b) a first water pipe connected to the bottom of said treatment vessel, (c) an aeration means provided at the bottom side of said treatment vessel, (d) a second water pipe connected to the top of said treatment vessel, and (e) a formed material comprising a felt activated carbon fiber cloth having adjacent surfaces with a cloth-to-cloth distance therebetween, accommodated in said treatment vessel as a packing medium, said felt activated carbon fiber cloth having a specific surface area, which is the ratio of surface area (cm$^2$) of felt activated carbon fiber cloth to effective volume (cm$^3$) of said treatment vessel, of 0.5–50 cm$^2$/cm$^3$, of said felt activated carbon fiber cloth being arranged so that the cloth surface is vertical and the cloth-to-cloth distance is 0.5–2.0 cm, said apparatus conducting an operation comprising introducing water to be treated, containing total organic carbon in an amount of 5 mg C/l or less, into the treatment vessel through either one of the first and second water pipes, passing the water along the surface of the felt activated carbon fiber cloth, subjecting the organic matter in the water to biological decomposition and removal under aerobic conditions by microorganisms living on the felt activated carbon fiber cloth while subjecting the water to aeration or no aeration, and discharging the treated water outside the treatment vessel through the other water pipe.

2. An apparatus for biological treatment of water according to claim 1, which comprises, in addition to (a) to (e), (f) a circulation vessel having an aeration means, connected with the first and second water pipes, thereby introducing, into the circulation vessel, part of the treated water discharged outside the treatment vessel through the first or second water pipe, aerating said treated water by the aeration means and returning the aerated water to the treatment vessel.

3. An apparatus for biological treatment of water according to claim 1, wherein the packing medium, which is the formed material accommodated in the treatment vessel is composed of a plurality of packed medium layers and an air bubble diffuser is provided between each two adjacent layers.

4. An apparatus for biological treatment of water according to any of claims 1–3, wherein the formed material is obtained by affixing a felt activated carbon fiber cloth to an unwoven or woven cloth substrate in a corrugated sheet shape, winding the corrugated sheet into a roll and arranging the roll in the treatment vessel with the axis of the roll being directed vertically.

5. An apparatus for biological treatment of water according to any of claims 1–3, wherein the formed material is obtained by affixing a felt activated carbon fiber cloth to an unwoven or woven cloth substrate in a corrugated sheet shape and arranging vertically in the treatment vessel a plurality of the corrugated sheets in parallel at equal intervals.

6. An apparatus for biological treatment of water according to any of claims 1–3, wherein the formed material is obtained by placing spacers on a felt activated carbon fiber cloth, winding the cloth into a roll and arranging roll in the treatment vessel with the axis of the roll being directed vertically.

7. An apparatus for biological treatment of water according to any of claims 1–3, wherein the formed material is obtained by placing spacers on a felt activated carbon fiber cloth and arranging vertically in the treatment vessel a plurality of the resulting cloths in parallel.

8. A method for biological treatment of water in which water containing organic matter is biologically treated to decompose and remove the organic matter, which method uses an apparatus for biological treatment of water comprising (a) a treatment vessel for effecting the biological treatment of water to be treated, (b) a first water pipe connected with the bottom of said treatment vessel, (c) an aeration means provided at the bottom side of said treatment vessel, (d) a second water pipe connected with the top of said treatment vessel, and (e) a shaped material comprising a felt activated carbon fiber cloth having adjacent surfaces with a cloth-to-cloth distance therebetween, accommodated in said treatment vessel as a packing medium, said felt activated carbon fiber cloth having a specific surface area, which is the ratio of surface area (cm$^2$) of felt activated carbon fiber cloth to effective volume (cm$^3$) of said treatment vessel, of 0.5–50 cm$^2$/cm$^3$, and said felt activated carbon fiber cloth being arranged so that the cloth surface is vertical and the cloth-to-cloth distance is 0.5–2.0 cm, and which method comprises introducing water to be treated, containing total organic carbon in an amount of 5 mg C/l or less, into the treatment vessel through either one of the first and second water pipes, passing the water along the surface of felt activated carbon fiber cloth, subjecting the organic matter in the water to biological decomposition and removal under aerobic conditions by microorganisms living on the felt activated carbon fiber cloth while subjecting the water to aeration or no aeration, and discharging the treated water outside the treatment vessel through the other water pipe.

9. A method for biological treatment of water according to claim 8, wherein said apparatus comprises, in addition to (a) to (e), (f) a circulation vessel having an aeration means, connected with the first and second water pipes, and wherein the water to be treated is not aerated in the treatment vessel, part of the treated water discharged outside the treatment vessel through the first or second water pipe is introduced into the circulation vessel and aearated therein by said aeration means, and the aerated water is returned to the treatment vessel.

10. A method for biological treatment of water according to claims 8, wherein in said apparatus the shaped material comprising a felt activated carbon fiber cloth as a packing medium is accommodated in the treatment vessel in the form of a plurality of layers and an air bubble diffuser is provided between each two adjacent layers and wherein the water to be treated is treated in each layer while being aerated by said air bubble diffuser.

11. (Amended) A method for biological treatment of water according to any of claims 8–10, wherein the shaped material is obtained by affixing a felt activated carbon fiber cloth to an unwoven or woven cloth substrate in a corrugated sheet shape, winding the corrugated sheet into a roll and arranging the roll in the treatment vessel with axis of the roll being directed vertically.

12. A method for biological treatment of water according to any of claims 8–10, wherein the shaped material is obtained by affixing a felt activated carbon fiber cloth to an unwoven or woven cloth substrate in a corrugated sheet shape and arranging vertically in the treatment vessel a plurality of the corrugated sheets in parallel at equal intervals.

13. A method for biological treatment of water according to any of claims 8–10, wherein the shaped material is obtained by placing spacers on a felt activated carbon fiber cloth, winding the cloth into a roll and arranging the roll in the treatment vessel with the axis of the roll being directed vertically.

14. A method for biological treatment of water according to any of claims 8–10, wherein the shaped material is obtained by placing spacers on a felt activated carbon fiber cloth and arranging vertically in the treatment vessel a plurality of the resulting cloths in parallel.

15. A method for biological treatment of water according to any of claims 8–10, wherein the treated water discharged outside the treatment vessel is introduced into a membrane separator to remove the microorganisms contained in the treated water.

16. An apparatus incorporated into a pure water production system and used for biological treatment of waste water arising from the use of pure water supplied from the pure water production system, in which said waste water containing total organic carbon in an amount of 5 mg C/l or less is biologically treated to decompose and remove total organic carbon for reuse as pure water, which apparatus comprises (a) a treatment vessel for effecting the biological treatment of the water to be treated, (b) a first water pipe connected to the bottom of said treatment vessel, (c) an aeration means provided at the bottom side of said treatment vessel, (d) a second water pipe connected to the top of said treatment vessel, and (e) a formed material comprising an activated carbon fiber felt cloth having adjacent surfaces with a cloth-to-cloth distance therebetween, accommodated in said treatment vessel as a packing medium, said activated carbon fiber felt cloth having a specific surface area, which is the ratio of surface area ($cm^2$) of activated carbon fiber felt cloth to effective volume ($cm^3$) of said treatment vessel, of 0.5–50 $cm^2/cm^3$, and said activated carbon fiber felt cloth being arranged so that the cloth surface is vertical and the cloth-to-cloth distance is 0.5–2.0 cm, (f) a membrane separator connected to either one of the first and second water pipes, said apparatus conducting an operation comprising introducing said waste water to be treated containing organic matter into the treatment vessel through either one of the first and second water pipes, passing the water along the surface of the activated carbon fiber felt cloth, subject the organic matter in the water to biological decomposition and removal under aerobic conditions by microorganisms attached to the activated carbon fiber felt cloth while subjecting the water to aeration or no aeration, introducing the treated water to the membrane separator through the other water pipe to eliminate microorganisms, and returning the filtered water to the feed water of the pure water production system.

17. A method for biological treatment of waste water arising from the use of pure water supplied from the pure water production system, in which said waste water containing total organic carbon in an amount of 5 mg C/l or less is biologically treated to decompose and remove organic compounds, which method uses an apparatus incorporated into a pure water production system and used for biological treatment of said waste water comprising (a) a treatment vessel for effecting the biological treatment of water to be treated, (b) a first water pipe connected with the bottom of said treatment vessel, (c) an aeration means provided at the bottom side of said treatment vessel, (d) a second water pipe connected to the top of said treatment vessel, and (e) a formed material comprising an activated carbon fiber felt cloth having adjacent surfaces with a cloth-to-cloth distance therebetween, accommodated in said treatment vessel as a packing medium, said activated carbon fiber felt cloth having a specific surface area, which is the ratio of surface area ($cm^2$) of activated carbon fiber felt cloth to effective volume ($cm^3$) of said treatment vessel, of 0.5–50 $cm^2/cm^3$, and said activated carbon fiber felt cloth being arranged so that the cloth surface is vertical and the cloth-to-cloth distance is 0.5–2.0 cm, (f) a membrane separator connected to either one of the first and second water pipes, said apparatus can conducting an operation comprising introducing said waste water to be treated, containing organic compounds into the treatment vessel through either one of the first and second water pipes, passing the water along the surface of the activated carbon fiber felt cloth, subjecting the organic matter in the water to biological decomposition and removal under aerobic conditions by microorganisms attached to the activated carbon fiber felt cloth while subjecting the water to aeration or no aeration, introducing the treated water to the membrane separator through the other water pipe to eliminate microorganisms, and returning the filtered water to the feed and after of the pure water production system.

* * * * *

UNITED STATES PATENT AND TRADEMARK OFFICE
CERTIFICATE OF CORRECTION

PATENT NO. : 5,518,620
DATED : May 21, 1996
INVENTOR(S) : EGUCHI et al.

It is certified that error appears in the above-indentified patent and that said Letters Patent is hereby corrected as shown below:

Column 8, line 36, change "18" to --21--;

Column 8, line 38, change "12" to --20--;

Column 8, line 44, change "12" to --20--; and

Column 9, line 15, change "12" to --20--.

Signed and Sealed this

Twenty-fourth Day of December, 1996

Attest:

BRUCE LEHMAN

*Attesting Officer*    *Commissioner of Patents and Trademarks*